R. N. HARRIS.
FENDER FOR MOTOR VEHICLES.
APPLICATION FILED FEB. 18, 1910.
981,260.
Patented Jan. 10, 1911.
2 SHEETS—SHEET 1.
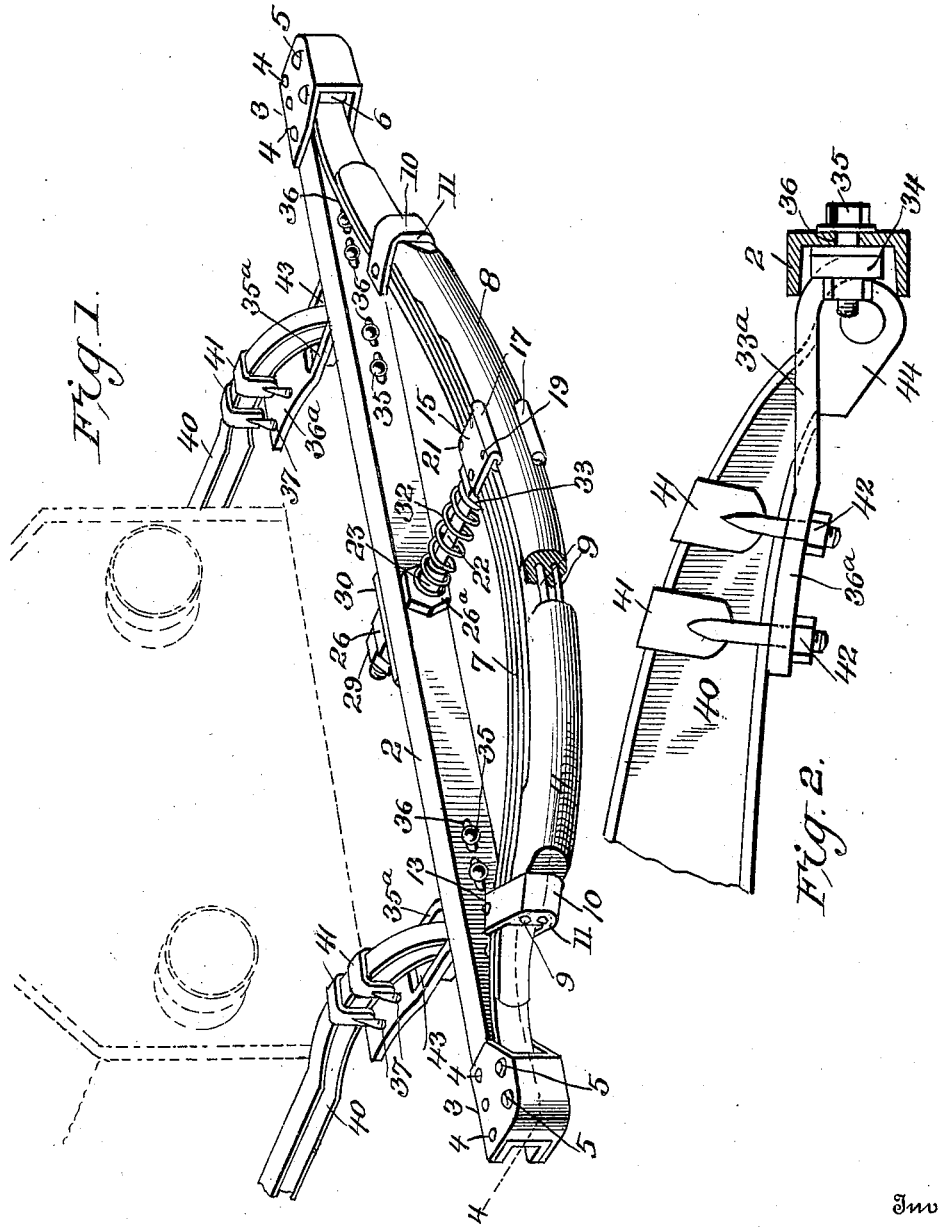
Witnesses
Inventor
R. N. Harris

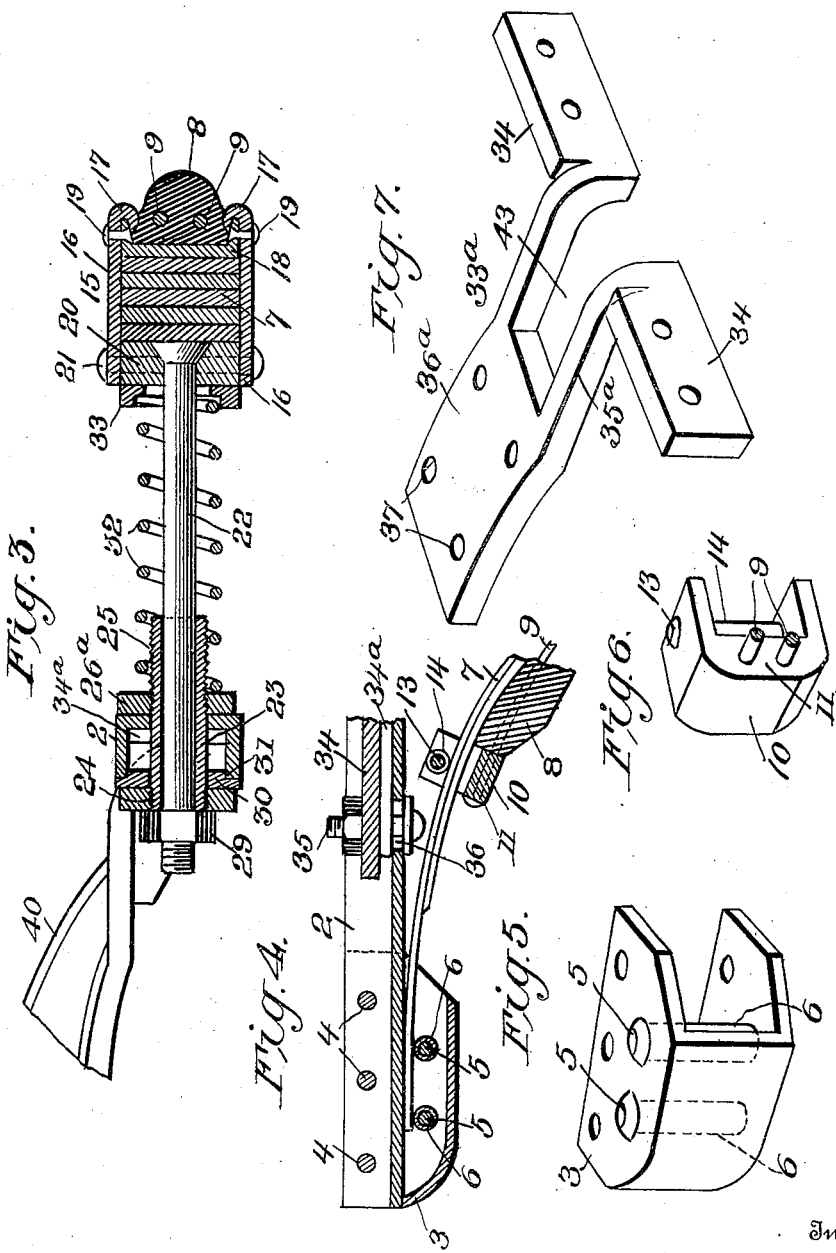

UNITED STATES PATENT OFFICE.

RALPH N. HARRIS, OF COLUMBUS, OHIO.

FENDER FOR MOTOR-VEHICLES.

981,260.  Specification of Letters Patent.  Patented Jan. 10, 1911.

Application filed February 18, 1910. Serial No. 544,706.

*To all whom it may concern:*

Be it known that I, RALPH N. HARRIS, a citizen of the United States, residing at Columbus, in the county of Franklin and State of Ohio, have invented certain new and useful Improvements in Fenders for Motor-Vehicles, of which the following is a specification.

The object of my invention is to provide a fender designed to protect the front of vehicles from injury due to obstacles, protect the lamps, wheels, the radiator and the engine, take up the extraordinary thrust and strain which is incident to a collision, and properly distribute it to the parts of the vehicle that can best stand it.

A further object is to so design the body of my fender that it shall form a partial protection to pedestrians who may be struck by the fender, the fender being placed about the height of the knee, and furnishing sufficient support to carry the person struck, in case he falls upon the fender.

A further object is to provide a fender in which the surface presented to the obstacle with which the motor vehicle comes in collision, shall have sufficient gripping power to prevent slipping and side wiping, an effect of a collision which often causes more damage than the actual impact.

Another object is to provide a fender in which the parts are detachable from each other and may be readily assembled, and which may be attached to any ordinary type of motor vehicle and distribute the thrust and strain along the side channel irons of the vehicle chassis without drilling any additional holes or removing any bolts or rivets.

In general terms, my improvement includes a bowed spring or like resilient member which is yieldable along its whole extent and which is supported in front of the automobile, this bowed spring being further provided with a yielding facing piece of rubber, leather or like material.

For a full understanding of the invention and the merits thereof, and to acquire a knowledge of the details of construction, reference is to be had to the following description and accompanying drawings, in which;

Figure 1 is a perspective view of my improved fender attached to the forward end of a motor vehicle; Fig. 2 is a fragmentary side elevation, partly in section, showing my fender attached to the frame of a motor vehicle; Fig. 3 is a section through the middle of my improved fender; Fig. 4 is a fragmentary section of one end of the base plate, the bowed spring co-acting therewith being shown in elevation, the buffer being in section; Fig. 5 is a perspective detail view of one of the shoes or clips carried at the extremities of the base plate; Fig. 6 is a perspective view of the means for attaching the fender to the frame of the motor vehicle.

Corresponding and like parts are referred to in the following description and indicated in all the views of the drawings by the same reference characters.

Referring to these figures, 2 designates a channel iron which forms the base of my improved fender and which is adapted to extend transversely of the car and to be attached thereto, as will be later described. This channel iron 2 has its flanges extending rearwardly or in the direction of the car. At the opposite ends of the channel iron 2 are provided the clips 3, these clips being U-shaped in section, open at their inner ends and closed at their outer ends. The clips are attached to the side flanges of the channel iron 2 by means of rivets 4, and passing transversely through the clips and exterior to the face of the channel iron 2 are the bolts or rivets 5 which are surrounded by rotatable sleeves or friction rollers 6.

Mounted between the clips 3 is a bowed spring 7, this spring being formed precisely like the usual carriage spring and consisting of superposed leaves, each leaf being shorter than the leaf immediately beneath it. In the construction shown, five leaves are illustrated, but it will be obvious that any number of these leaves may be used as found most effective in practice. Supported on the exterior face of the set of spring leaves is the buffer piece 8 which is preferably made of rubber and has a rounded outer face. The buffer 8 is provided, as shown in Fig. 1, with two parallel wires 9 which extend entirely through the buffer piece 8 and project beyond the same and into a clip 10, this clip having inwardly extending end portions 11 which clasp the leaves of the spring 7 held in place by a transverse bolt or rivet 13 surrounding which is a rotatable sleeve 14 which bears against the under face of the innermost leaf of the spring. It will thus be seen that while the buffer piece 8 is held firmly to the face of the spring, it may shift slightly when it is deformed by impact.

Attached to the middle of the spring 7 is the clip 15 which has two side plates 16, the upper ends of which are bent over to form inwardly extending round flanges 17. These plates 16 are spaced from each other at their upper ends by a transverse bed plate 18 having outwardly turned ends which engage beneath the overturned edges of the plates 16 and are attached thereto by rivets 19. The buffer 8 has a widened base or inner portion which fits beneath the inwardly extending flanges 17 so that the buffer is held upon the bed plate 16 after the manner of a rubber tired wheel. This permits the buffer to be removed and replaced whenever desired. The lower portions of the plates 16 are spaced from each other by a transverse plate 20 through which pass the parallel rivets or bolts 21. This lower plate 20 is drilled for the reception of the head of a bolt 22 whose head bears against the under side of the spring 7. This bolt at its other end extends through the channel iron 2. Surrounding the bolt and also extending through the channel iron 2 is the sleeve 23 which is screw threaded at its inner end, as at 24, and at its outer end, as at 25, this screw-threaded portion 25 extending about half the length of the sleeve. Nuts 26 and 26ª engage with the opposite ends of the sleeve, and a nut 29 engages with the inner end of the bolt 22. The nut 26ª rests upon the face of the channel iron, while the nut 26 rests upon a transverse plate 30 which is shouldered, as at 31, to fit between the side flanges of the channel iron. It will be seen that with this construction the bolt 22 is movable through the channel iron and through the sleeve 23 and that the nut 29 acts as a stop limiting the outward movement of the bolt. A spring 32 surrounds the bolt 22, resting at its inner end upon the nut 26ª and at its outer end against the plate 20, being held in place thereon by an annular member 33.

It will be seen from Fig. 1 that the innermost and longest leaf of the spring 7 at its ends extends into and is housed by the clips 3 and that it is shiftable between the face of the channel iron 2 and the sleeves or rollers 6 so that when the spring is forced inward, the longest leaf of the spring will move laterally through the clips 3, thus allowing the spring to have a maximum of resilience and yet be held firmly in place.

The operation of my invention will be obvious from the foregoing description. When the fender is subjected to shock, the bowed spring 7 will tend to flatten out and the extremities of the spring will be forced into the clips 3, the leaves of the spring yielding upon each other in the ordinary manner. At the same time, the middle portion of the spring will be forced inward against the tension of the spring 32.

While I do not wish to limit myself to any particular means of attaching my fender to a motor car, I preferably provide the channel iron with the pairs of angle irons 33ª. The base flanges 34 of these angle irons are formed with bolt holes whereby they may be attached to the channel iron 2, bolts 35 passing through slots 36 in the channel iron. The base plates 34 of the angle irons 33ª extend angularly from a pair of spaced arms 35ª which at their outer ends are formed with a slightly curved plate 36ª which is provided with the opposed bolt holes 37. This construction provides a means whereby the fender may be attached to the side frame bars 40 of a motor car by means of clips 41 which pass over the frame bars 40 and have screw threaded ends which extend down through openings 37 and are there provided with nuts 42. A downward extension of each frame bar 40 extends through the space 43 left between the arms 35ª, the arms resting upon the upper face of the end member 44 of the frame bar 40 so as to be supported thereon. It will be seen that this method of attachment obviates the necessity of drilling holes in the frame bars of the chassis, which is a practice which is not approved by manufacturers or those insuring automobiles against accident.

Having thus described the invention, what I claim is:—

1. A motor vehicle fender comprising a transverse supporting member, and a bowed spring mounted on said supporting member, the ends of the bowed spring bearing against the supporting member and being free to move laterally thereon under pressure, the middle of the spring being supported for rearward movement.

2. A fender for motor vehicles, including a transverse supporting member, a bowed spring, clips at the ends of the supporting member, in which the ends of the bowed spring slidingly engage, a bolt connected to the middle of the spring and extending through the supporting member and movable therein, and a spring surrounding the bolt and bearing outward against the middle of the bowed spring.

3. A fender for motor vehicles, including a transversely extending channel iron, clips carried on the extremities of the channel iron and having anti-friction rollers, a bowed spring having its extremities inserted in said clips and bearing against the anti-friction rollers, a clip engaging the middle of the spring, a bolt on the clip extending rearward through the supporting member, a sleeve surrounding the bolt and passing through the supporting member, means for holding the sleeve in engagement with the supporting member, and a compression spring surrounding the bolt and bearing at one end against the middle of the spring and at its other end against the supporting member.

4. A fender for motor vehicles, including a transversely extending supporting member, a bowed spring mounted on the supporting member, the ends of said spring being free to move laterally, and a buffer of yielding material attached to and extending along the face of the bowed spring.

5. A fender for motor vehicles, including a transverse supporting member, a bowed spring mounted on the face of the supporting member, the ends of the spring having sliding engagement therewith, and a buffer extending along the face of the spring, said buffer being made of yielding material.

6. A fender for motor vehicles, including a transverse supporting member, a bowed spring having its ends in sliding engagement with the supporting member, and a buffer extending along the face of the bowed spring, the ends of said buffer having sliding engagement with the spring, the middle of the buffer being rigidly engaged therewith.

7. A fender for motor vehicles, including a transverse supporting member having clips at its extremities, a bowed spring, the ends of which are engaged by said clips, a guide bolt extending from the middle of the spring through said supporting member and having sliding engagement therewith, a buffer mounted upon the face of the spring, said buffer having longitudinally extending wires passing through it and projecting at its ends, and clips engaging said wires and also engaging beneath the spring.

8. A fender for motor vehicles, including a transversely extending channel iron, clips at the opposite ends of the channel iron, U-shaped in cross section and provided with transversely extending anti-friction rollers, a bowed spring comprising a plurality of leaves, the extremities of the spring extending into said clips and beneath the anti-friction rollers, a buffer, clips holding the ends of the buffer to the spring, a clip engaging the middle of the buffer and having inwardly projecting flanges with which the buffer engages, means for attaching the clip to said spring, a guide bolt attached to said clip and extending through the transversely extending channel iron and having sliding engagement therewith, a nut on the bolt acting to limit the outward movement of the bolt, and a compression spring surrounding the bolt and bearing at one end against the channel iron and at its other end against the clip.

9. A fender for motor vehicles including a transversely extending support and a buffer mounted upon the face of the support, attaching members mounted on the support and extending rearward therefrom and comprising each a horizontal plate adapted to be supported against the under side of the side frame bars of a chassis, clips passing over said last named frame bars and engaging said plate, said plate being cut away at its middle forward portion to receive the downwardly extending end of the frame bar and being then bent angularly to engage with the said transversely extending buffer support.

10. In a fender for motor vehicles, a transversely extending supporting member, a bowed spring mounted on the supporting member, attaching members mounted on the supporting member and extending rearward therefrom and comprising each a horizontal plate adapted to be supported against the under side of the side frame bar of a chassis, clips passing over said frame bar and engaging the plate, said plate being cut away at its forward portion to receive the downwardly extending end of the frame bar and being then bent angularly to engage with the transversely extending supporting member.

11. A fender for motor vehicles including a transverse supporting member, a bowed spring carried upon the face of the supporting member, the extremities of the bowed spring being free to move laterally upon the face of the supporting member, and a bolt connected at one end to the middle of the spring and passing rearward through the supporting member, and freely movable therein.

12. A fender for motor vehicles including a transversely extending supporting member, a bowed spring mounted on the supporting member, clips at the ends of the supporting member in which the ends of the bowed springs have sliding engagement, a bolt connected to the middle of the spring and extending through the supporting member and longitudinally movable therein, and a U-shaped member engaging the outer face of the bowed spring on each side thereof and holding the spring in engagement with the head of the bolt.

13. A fender for motor vehicles including a transverse supporting member, a bowed spring, the ends of which are laterally movable, and bear against the face of the supporting member, a bolt freely movable through the supporting member, a buffer mounted upon the face of the spring and having laterally and outwardly projecting base flanges, a clip engaging the spring and engaged by said bolt, said clip including side-plates located on each side of the spring, the outer edges of the side-plates being inwardly turned to engage the flanges on the base portion of the buffer.

14. The combination with a fender for motor vehicles including a transversely extending support, and a buffer mounted upon the face of the support, attaching members adapted to be supported against the under side of the side-frame bars of a chassis, the forward end of the attaching member being provided with spaced arms having angular ends bearing against the transverse support and attached thereto, and clips passing over each chassis frame bar and engaging said members.

In testimony whereof I affix my signature in presence of two witnesses.

RALPH N. HARRIS. [L. S.]

Witnesses:
HERBERT M. MYERS,
MAUDE RECOB.